United States Patent

Maertens et al.

(10) Patent No.: US 7,921,626 B2
(45) Date of Patent: Apr. 12, 2011

(54) APPARATUS AND METHOD FOR CONTROLLING THE SPEED OF A COMBINE HARVESTER

(75) Inventors: Koen O. G. Maertens, Oostuinkerke (BE); Bart M. A. Missotten, Winksele (BE); Dries M. J. Depreitere, Koekelare (BE); Tom Coen, Zemst (BE)

(73) Assignee: CNH America LLC, New Holland, PA (US)

( * ) Notice: Subject to any disclaimer, the term of this patent is extended or adjusted under 35 U.S.C. 154(b) by 222 days.

(21) Appl. No.: 12/291,284

(22) Filed: Nov. 7, 2008

(65) Prior Publication Data

US 2009/0241499 A1  Oct. 1, 2009

(30) Foreign Application Priority Data

Nov. 8, 2007  (GB) .................................. 0721909.0

(51) Int. Cl.
*A01D 41/127* (2006.01)
(52) U.S. Cl. ................. 56/10.2 R; 56/10.2 G; 56/10.2 H
(58) Field of Classification Search ............... 56/10.2 R, 56/10.2 G, 10.2 H
See application file for complete search history.

(56) References Cited

U.S. PATENT DOCUMENTS

| 4,430,846 | A |   | 2/1984 | Presley et al. |
| 4,513,562 | A | * | 4/1985 | Strubbe ....................... 56/10.2 G |
| 4,934,985 | A | * | 6/1990 | Strubbe ............................. 460/4 |
| 5,666,793 | A | * | 9/1997 | Bottinger ................... 56/10.2 R |
| 6,460,008 | B1 |  | 10/2002 | Hardt |

\* cited by examiner

*Primary Examiner* — Alicia M Torres
(74) *Attorney, Agent, or Firm* — Michael G. Harms; Patrick M. Sheldrake

(57) ABSTRACT

Apparatus for controlling the speed of a combine harvester (10) includes one or more sensors (48) each generating one or more signals that correspond during use of the combine harvester to variables of a harvesting process. The apparatus further includes a processor and one or more control devices operatively connected in a feedback arrangement including two loops. In a first loop, a first signal (28) corresponding to the ground speed of the combine harvester (10) is fed back as an input to a first control device (42) that is capable of adjusting the ground speed relative to a set value. In a second loop, the first signal (28) is fed together with a second signal (34) indicative of the flow rate of crop through the combine harvester to a second control device (32) that generates as a third signal (31) the set value, the third signal being input to the first control device (42).

16 Claims, 6 Drawing Sheets

APPARATUS AND METHOD FOR CONTROLLING THE SPEED OF A COMBINE HARVESTER

CROSS REFERENCE TO RELATED APPLICATIONS

This Patent Application claims priority under 35 U.S.C. §119 to GB 0721909.0, filed on Nov. 8, 2007 titled, "Apparatus and Method for Controlling the Speed of a Combine" and having Koen O. G. Maertens, Bart M. A. Missotten, Dries M. J. Depreitere and Tom Coen as inventors. The full disclosure of GB 0721909.0 is hereby fully incorporated herein by reference.

This invention relates to apparatus and a method for controlling the speed of a combine harvester.

As is well known, a combine harvester is a large, powerful vehicle that moves in a field of crop for the purpose of harvesting the crop according to a complex cutting, threshing and cleaning process that takes place predominantly in the body of the combine harvester.

A header assembly, e.g. a grain header including a cutter bar and reel, protrudes from the forwardmost end of the combine harvester for the purpose of cutting crop in a field and feeding it towards a straw elevator again located at the front of the machine. The purpose of the straw elevator primarily is to raise the crop (which at this stage includes grains secured in ears to stem parts) to, initially, the threshing drum of the combine harvester. The threshing drum operates to separate the grains from the remaining crop plant parts according to a per se known action.

A combine harvester in operation is a very wide machine. The header extends beyond the full width of the front of the combine harvester so as to maximise the width of crop harvested with each pass of the combine harvester along a field.

The straw elevator is substantially narrower than the header. The arrangement of the parts of the front of a combine harvester is such that the crop parts which are cut in the header assembly are driven together as part of a motion of transferring them to the base of the straw elevator. As a consequence the straw elevator is able to accommodate a considerably greater density of crop material per unit width than the density of the crop when it is standing in a field.

The feed rate of crop through a combine harvester may be determined by many factors the predominant one of which is the forward ground speed of the vehicle.

In short, the faster the combine harvester travels the greater is the quantity of grain per unit time that is ingested into the straw elevator.

Crop densities are not invariant from place to place in a field. On the contrary, the density of crop may vary significantly.

If the driver of a combine harvester were to harvest a field having such varying densities of crop by driving at a constant speed through the field, the rate at which crop is ingested into the harvesting machine via the header assembly and straw elevator would also vary.

Typically a combine harvester driver would seek to maximise the work rate of his machine, by driving it as quickly through a field as the field conditions allow, without exceeding threshing, separating and cleaning capabilities of the machine. This may mean that the combine harvester operates for much of the time near the limits of its capacity. If the combine harvester at such a time were to encounter unexpectedly a region of increased crop density, the harvester driver might not be able to avoid ingesting a very large amount of crop at a time, such that the straw elevator or other crop conveying and processing parts of the harvesting machine become overloaded.

At the very least, such overloading leads to inefficiencies in the harvesting process since it causes significant amounts of grain to be wasted ("lost") or to require one or more supplementary passes through the combine harvester for the purpose of rethreshing and recleaning the crop material. However such overloading can also lead to plugging of the flow of crop material through the combine harvester, e.g. between the threshing drum and the adjacent "concave". This is a particularly undesirable condition since it may lead to several hours of maintenance/cleaning work before the machine can become operable again.

Another adverse effect of overloading is the over-stressing of mechanical components. This may lead to stalling of the engine of the combine harvester and/or even damaging of components.

In many parts of the world in which grains are grown the economics of farming are finely balanced.

Thus a reduction in farming efficiency may adversely influence the question of whether a farming operation occurs at a profit. For this reason it is strongly undesirable for the aforementioned conditions to arise during harvesting. In many instances, however, the best attempt at avoiding overloading of the combine harvester amounts to visual inspection, by the harvester driver, of regions of crop that are about to be harvested.

Aside from the fact that such observation, even when undertaken by an experienced driver, is likely to result in inaccurate adjustments of the vehicle speed for the purpose of levelling the flow rate of crop for a time, inevitably the driver additionally must cope with the myriad other complicated requirements of operating a harvesting machine. The result is that the harvester operator is very unlikely to react sufficiently accurately or quickly to any perceived increase or decrease in crop density (even if such a perception is correct) such that he can adjust the speed of the harvesting machine so as to maintain maximal efficiency as judged with reference to work rate and/or grain losses.

It is known to provide sensing devices for sensing the feed rate of crop material within a harvesting machine. It is also known to connect such sensors operatively to control components such that eg. the forward speed of the combine harvester may be adjusted in dependence on a measurement of the amount of crop instantaneously passing through a particular part of the machine.

Such systems may in theory be employed for the purpose of automatically coping with variations in crop density of the kind described hereinabove. In practice, however, the prior art subsystems are distinctly sub-optimal at providing solutions to the problems set out above.

In one known crop flow measuring system, for example, the sensors are arranged to measure the instantaneously prevailing torque generated in the threshing drum of the combine harvester.

It is known that the threshing drum torque is proportional to the amount of crop being threshed in the combine harvester, so at first sight this would be an acceptable parameter to monitor for the purpose of controlling the feed rate of crop through the machine. However, it has been found that a control philosophy based on the threshing drum torque is inaccurate partly because by the time crop material reaches the threshing drum it may have been inside the harvesting machine for 5 seconds. This means that there is a lag of 5 seconds or more in the generation of any control signal that is intended to signify an unacceptable increase in crop density.

Clearly if a combine harvester operates in an area of unacceptably high density for several seconds there is a severe risk of the undesirable conditions described above arising. This however is almost unavoidable in the case of a control philosophy based on measuring the threshing drum torque. The invention has been developed with a view therefore to providing a more accurate control of the feed rate of crop through a combine harvester than has hitherto been available.

Similarly, if a dramatic decrease in crop density occurs and is only detected by the time the crop reaches the threshing drum, under-loading of the combine harvester may occur. One adverse result of this may be excessive consumption of fuel relative to the quantity of crop harvested. Since as noted it is very important for harvesting operations to take place as efficiently as possible, it is strongly undesirable for the harvesting machine to be under-utilised at any time during its pass along a field.

At the same time, a major factor in the operation of a combine harvester is the comfort of the operator. A vehicle ground speed control philosophy that results in repeated, abrupt automatic adjustments of the forward speed is likely to be unpleasant for the driver. In such a case the driver's work rate and skill level are likely to deteriorate with adverse consequences on the efficiency of the farming operation.

According to a first aspect of the invention therefore there is provided apparatus for controlling the speed of a combine harvester, the apparatus comprising one or more sensors each generating one or more signals that correspond during use of the combine harvester to variables of a harvesting process; a processor; and one or more control devices operatively connected in a feedback arrangement comprising two loops in a first of which a first said signal corresponding to the ground speed of the combine harvester is fed back as an input to a first said control device that is capable of adjusting the said ground speed relative to a set value; and in a second of which the said first signal is fed together with a second said signal indicative of the flow rate of crop through the combine harvester to a second said control device that generates as a third signal the said set value, the third signal being input to the first said control device.

An advantage of such apparatus is that it permits a hybrid control philosophy, in which a ground speed set point may be established so as to seek to control the ground speed of the combine harvester according to general limits determined by the driver's approach to operation (ie. maximising work rate, minimising grain losses, minimising fuel consumption, etc.), whilst simultaneously permitting an instantaneous control that responds to variations eg. in crop density based on signals input to the other of the control loops. This in turn provides for an accurate control that provides a high degree of comfort for the operator.

To this end, therefore, optionally for a fourth said signal corresponding to a desired flow rate value is additionally input to the first said control device, the magnitude of the fourth said signal being manually adjustable by an operator of the combine harvester or automatically by a further controller in response to the said variables of the harvesting process.

Conveniently the combine harvester includes a header having a first rotatable component and the signal indicative of the flow rate of crop is generated at least in part by a said sensor that measures the header drive torque generated in a said rotatable component and outputs a signal that is related thereto.

A major advantage of the invention lies in the feature of sensing the flow rate of crop at or near to the header assembly.

As a consequence, any sudden increase or decrease in crop density in a field may be detected and accounted for by the apparatus of the invention almost immediately it is encountered. For reasons explained above this is a significant advantage of the invention over the prior art.

Typically, as noted, a combine harvester includes a straw elevator having at least one rotatable component. In a further arrangement, therefore, according to the invention the signal indicative of the flow rate of crop is generated at least in part by a said sensor that measures the straw elevator drive torque generated in the further rotatable component and outputs a signal that is related thereto.

Such an arrangement confers essentially the same advantage as measuring the header drive torque, since the torque in the straw elevator is generated at a location sufficiently close to the location of standing crop as to provide an input quickly enough for a control action to take place as described above. Such a control action typically would amount to increasing or decreasing the ground speed of the combine harvester (for example by adjusting the engine governor setting automatically through use of a solenoid-activated control member or by adjusting the angle of the swash plate in the pump or motor of the hydrostatic drive of the harvester's wheels).

Conveniently the apparatus includes a common said sensor that measures the header drive torque and the straw elevator torque.

In a preferred embodiment of the invention the apparatus includes a drive belt for driving the first rotatable component and/or the further rotatable component, wherein the common sensor measures tension in the drive belt.

In a practical arrangement, that is commonplace in a combine harvester, a single drive belt drives both the rotatable part of the header assembly and the rotatable auger that defines the operative portion of the straw elevator. Therefore in particularly preferred embodiments of the invention it is desirable to sense the tension in the drive belt since in many designs of combine harvester this amounts to measuring of the header and straw elevator torque values simultaneously.

In more detail the apparatus preferably includes a sensing pulley in engagement with the drive belt, the sensing pulley including or being operatively connected to a load cell for measuring the force acting between the drive belt and the pulley and generating a signal indicative thereof.

Such an arrangement is advantageously simple to embody, and has the additional advantage that it affects only minimally the delivery of driving torque to the header assembly and straw elevator. Therefore the sensing pulley does not noticeably reduce the efficiency of the operation of the combine harvester.

In a preferred embodiment of apparatus according to the invention the processor is a programmable device that is capable of calculating the tension in the drive belt, and hence the flow rate of crop, according to a model that takes account of prevailing conditions within the combine harvester.

More particularly, the tension in the drive belt is calculated in the processor in accordance with the expression $$F(t) = F_c(t) + F_G(\theta(t), \phi(t)) + F_0$$

wherein
F is the measured force;
$F_0$ is a zero-load force component;
$F_G$ is a gravity-induced force component related to the effect of gravity on the mass of the sensing pulley;
$F_C$ is a component of force related to the flow rate of crop through the combine harvester; and
$\theta(t)$ is the longitudinal inclination of the combine harvester at time t; and
$\phi(t)$ is the transverse inclination of the combine harvester at time t.

In this regard, it is particularly helpful firstly to derive an expression whose output is directly proportional to the flow rate of crop through the combine harvester and secondly that takes account of the mass of the sensing pulley (which preferably is designed as a relatively massive component so that it is able to withstand the substantial forces that in use act on the belt).

The above-mentioned expression automatically takes account of variations in the crop flow rate deriving from driving of the combine harvester on a slope. Indeed, the algorithm operated in the processor makes the measurement indifferent to any cause of crop flow rate variations, and especially those relating to operation on an incline since the only substantial gravity-related component of the tension in the drive belt results from the mass of the sensing pulley (the effect of which is accounted for by the term $F_G$). The portion of the belt contacting the sensing pulley may by comparison be considered essentially mass-less for the purposes of the calculation.

The apparatus additionally preferably includes an estimator of a variable static gain of the header and straw elevator operatively connected in the feedback arrangement.

The estimator preferably is embodied in the processor, especially in the form of programming of software.

The static gain of the apparatus is the relation between the ground speed of the combine harvester and the flow rate of crop through the combine harvester. It is related to the local total crop yield (specific mass per area unit of the harvested crop) and a number of parameters of the precise set-up of the combine harvester. These parameters include the cutting width (ie. the header width) and the width of the crop elevator; the no-load torque of the header assembly; the ground speed of the combine harvester and the driving torque component resulting from the local total crop yield.

Therefore in a preferred embodiment of apparatus according to the invention the variable static gain estimated by the estimator is defined by the expression $$K\text{stat} \approx y_o((W-A)^2 + bW/a + c)$$

wherein
Kstat is the variable static gain;
$y_o$ is the local total crop yield;
W is the cutting width of the header;
A is the width of the straw elevator; and
a, b and c are constants.

As indicated, the control device may be or include an engine governor adjuster or an actuator positioning the swash plate in a hydraulic pump and/or motor.

It is also preferable that the processor includes programmed therein one or more calibration algorithms for calibrating the apparatus in accordance with one or more of:
the type of header fitted to the combine harvester;
the header width; and/or
the type of crop to be harvested.

The invention is also considered to reside in a combine harvester including apparatus as defined herein, the combine harvester including one or more sieves having operatively connected thereto a sieve sensor for detecting the amount of material on the sieve and generating a signal indicative thereof, the output of the sieve sensor being input to the processor of the apparatus and the processor being arranged to reduce the flow rate of crop through the combine harvester in the event of the sieve sensor indicating a sieve overload condition.

According to a further aspect of the invention there is provided a method of controlling the ground speed of a combine harvester including apparatus comprising one or more sensors each generating one or more signals that correspond during use of the combine harvester to variables of a harvesting process; and a processor, the method comprising the steps of generating in each of one or more sensors one or more signals that correspond during use of the combine harvester to variables of a harvesting process; and in dependence on the values of the said signals operating one or more control devices connected in a feedback arrangement comprising two loops in a first of which a first said signal corresponding to the ground speed of the combine harvester is fed back as an input to a first said control device that is capable of adjusting the said ground speed relative to a set value; and in a second of which the said first signal is fed together with a second said signal indicative of the flow rate of crop through the combine harvester to a second said control device that generates as a third signal the said set value, the third signal being input to the first said control device.

A preferred embodiment of the method of the invention may be carried out using apparatus as defined herein, and/or in a combine harvester as defined herein.

There now follows a description of preferred embodiments of the invention, by way of non-limiting example, with reference being made to the accompanying drawings in which.

The terms "grain", "straw", and "tailings" are used principally in this specification for convenience and it should be understood that these terms are not intended to be limiting. Thus "grain" refers to that part of the crop which is threshed and separated from the discardable part of the crop material which is referred to as "straw" and "chaff". Incompletely threshed ears are referred to as "tailings". Also, the terms "forward", "rearward", "upper", "lower", "left", "right", etc. when used in connection with the combine harvester and/or components thereof, are determined with reference to the combine harvester in its normal operational condition and may refer either to the direction of forward operative travel of the combine harvester or to the direction of normal material flow through components thereof. These terms should not be construed as limiting.

Figure 1:
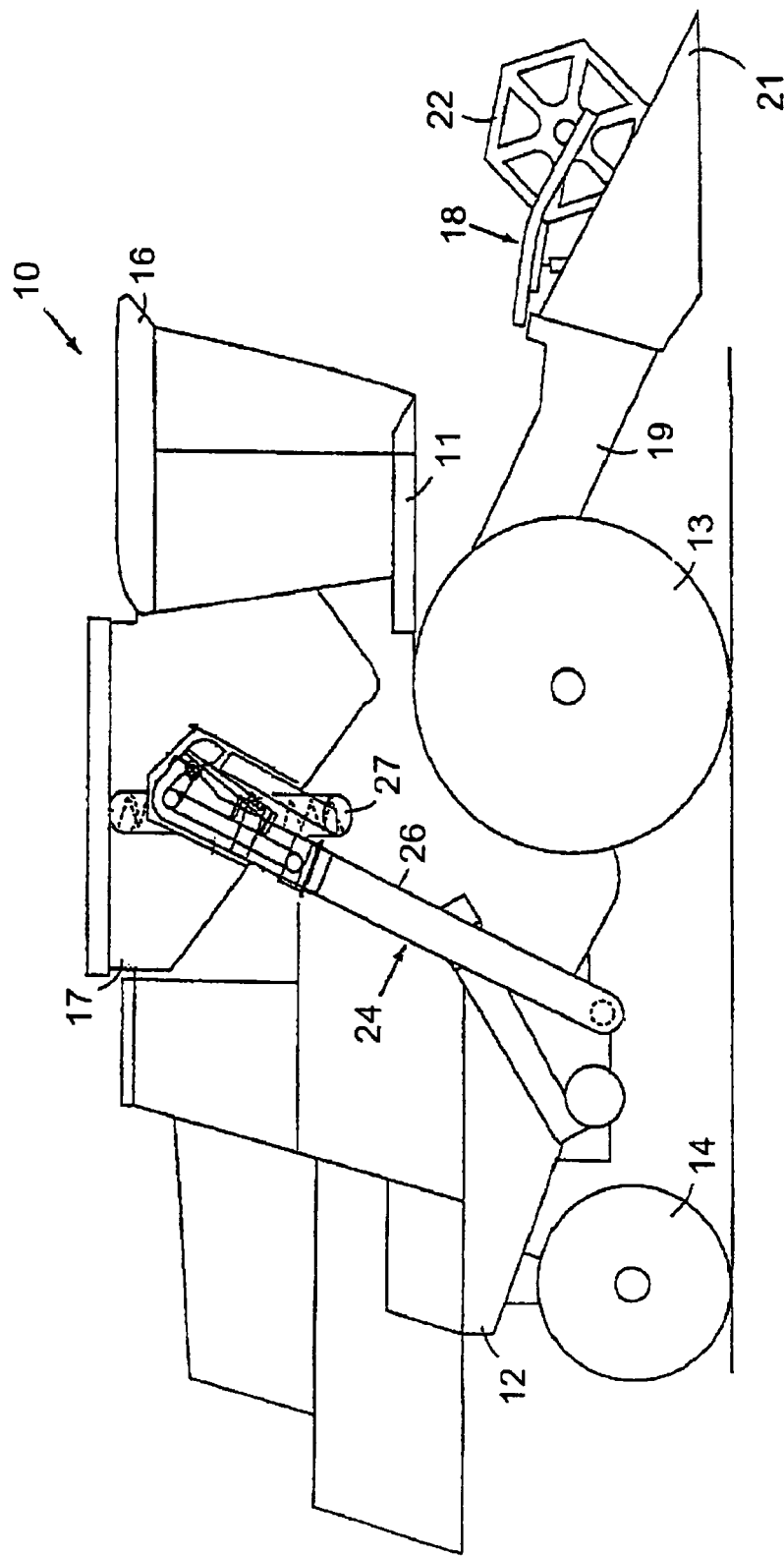
FIG. 1 is a schematic, side-elevational view of a combine harvester that may incorporate apparatus in accordance with the invention.

A typical combine harvester 10, as is shown in FIG. 1, comprises a main chassis or frame 12 supported on a front pair of traction wheels 13 and a rear pair of steerable wheels 14. Supported on the main chassis 12 are: an operator's platform 11 with a cab 16; a grain tank 17; a threshing and separating mechanism (not shown); a grain cleaning mechanism (not shown); and an engine (also not shown). The engine provides the motive power for the various driven components of the machine as well as for the traction wheels 13. A conventional grain header assembly 18 and straw elevator 19 extend forwardly of the main chassis 12. The header 18 and straw elevator 19 are pivotally secured to the chassis 12 for generally vertical movement which is controlled by extensible hydraulic cylinders. As the combine harvester 10 is propelled forwardly over a field with standing crop, the latter is severed from the stubble by a sickle or cutter bar 21 (FIG. 6) on the header 18, whereafter a reel 22 and a header auger 23 (FIG. 6) convey the cut crop to the straw elevator 19 which supplies it to the threshing and separating mechanism. The crop received within the threshing and separating mechanism is threshed and separated; that is to say, the crop (which may be wheat, corn, rice, soybeans, rye, grass seed, barley, canola, oats or other similar crops) is rubbed and beaten, whereby the grain, seed or the like, is loosened and separated from the straw, stalks, coils or other discardable part of the crop.

Grain which has been separated from the straw falls onto the grain cleaning mechanism (not shown) which comprises means to separate chaff and other impurities from the grain, and means to separate unthreshed crop material (tailings). Cleaned grain is then conveyed to the grain tank 17 by a clean grain conveyor 24 comprising a lower paddle type elevator 26 and an upper, so-called "bubble-up" auger 27. The tailings that reach the end of the cleaning mechanism, either may be returned via a tailings conveyor to the threshing mechanism for reprocessing, or otherwise may be reprocessed in a separate tailings rethresher and returned to the cleaning mechanism for a repeat cleaning action.

FIG. 1 helps to illustrate that it requires considerable time, say of the order of 5 seconds, for crop cut at the header assembly 18 to reach the region of the threshing drum which, in the process flow illustrated by FIG. 1, is located above the grain cleaning mechanism. Therefore, as indicated, any control system that aims to control the combine harvester based on measurements at the threshing drum could not take account of instantaneously prevailing conditions in the vicinity of the header assembly.

In addition the torque measurement signal of the threshing drum has a bad signal-to-noise ratio; and when crop becomes cluttered between the header and the drum, the signal might show short torque peaks which are not caused by actual changes in overall crop flow. Hence, the torque signal is not a precise indication of the incoming crop load.

It follows from this that any attempt to control the ground speed of the combine harvester 10 on the basis of the threshing drum torque may exacerbate the effects of, for example, a sudden increase in crop density in a field. It further follows therefore that any threshing drum torque-based control scheme of necessity is likely to be somewhat crude and should provide for a substantial safety margin. Otherwise, the system would still have to provide for intervention by an operator who must continually observe and anticipate sudden changes of the crop density in order to avoid overload conditions.

A control philosophy based on the threshing drum torque can be implemented in a simple feedback loop that has linear gain terms. Because of the great time lag and the bad signal-to-noise ratio, these gain terms should be kept low, since otherwise control system instability could arise.

Figure 4:
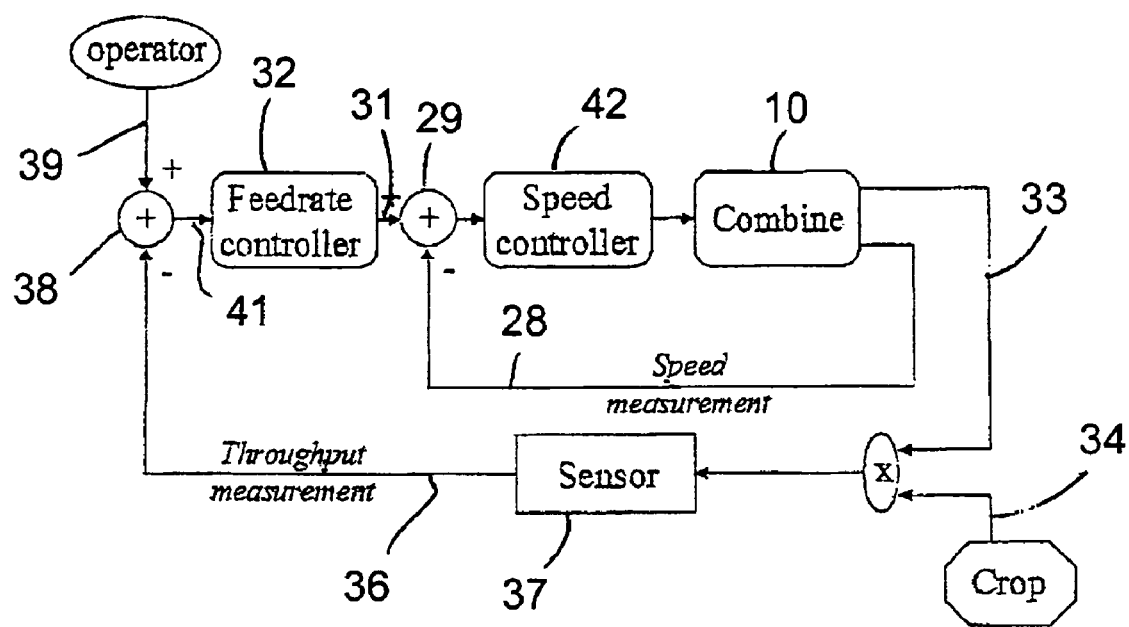
FIG. 4 shows in schematic form a control philosophy according to the principles of the invention disclosed herein.

As best shown in FIG. 4, however, an apparatus, a method and a combine harvester according to the invention rely on two "nested" feedback loops, in a first of which the actual ground speed of the combine harvester (as represented by line 28 in FIG. 4) constitutes a first feedback loop and is subtracted in a summing junction 29 from a speed set point signal 31 generated in a feed rate controller 32 preferably embodied in a processor incorporated within the combine harvester 10.

The output of the feed rate controller 32 is generated as part of a second control loop in which parameters of the combine harvester 10 as represented by signal 33 multiplied by the parameters of the crop represented by line 34 contribute to create a signal indicative of the flow rate of crop as represented by signal 36. The harvester parameters include the ground speed, and the header width that is actually used for cutting and harvesting crop. The crop parameters include the density of the crop at the inlet of the header.

Crop flow rate signal 36 is the output of a crop flow rate sensor 37 that is described in more detail below.

The crop flow rate signal 36 is subtracted in a further summing junction 38 from a feed rate set point signal 39 that is determined by settings of controls in the operator's cab. The feed rate set point may be determined manually by an operator of the combine harvester 10 or automatically by a further higher-level control system. Such further control system determines a feed rate set point from the performance of the threshing, separating and grain cleaning mechanisms as derivable from parameters such as clean grain flow rate, grain loss, grain quality, etc. The further control system may also be embodied in a processor incorporated within the combine harvester 10.

The output signal 41 of summing junction 38 is the input to the feed rate controller 32 embodied in the processor of the combine harvester 10.

The output of summing junction 29 is fed forwardly to a speed control device 42 that may comprise eg. an actuator that adjusts the setting of the governor of the engine of the combine harvester 10 or the position of a swash plate in a hydraulic pump and/or motor in a hydrostatic drive of the front wheels 13. The speed control device 42 may also comprise a controller that is able to compensate for wheel slippage.

The adoption of such a two-loop control arrangement in the apparatus of the invention provides for an accurate control that may conveniently be based on crop flow rate measurements in the combine harvester at or near the header assembly 19.

To this end it is possible, in accordance with the invention, to provide a sensor for measuring the flow rate of crop in this vicinity.

The inventors have established that not all measurable parameters in the combine process are strongly related to the feed rate of biological material (crop) through the machine. The inventors have confirmed experimentally that the header/elevator torque measurement described herein is strongly related to feed rate and hence is a highly suitable parameter.

In accordance with one embodiment of the invention the sensor 37 takes the form of a sub-system that operates to determine the tension in a drive belt that drives the rotatable parts of a header assembly and/or the rotatable parts of the straw elevator 19.

The provision of a common drive belt for driving the rotatable parts of the header assembly 18 and the straw elevator 19 is typical in the construction of combine harvesters. Measuring the tension in such a drive belt provides an indication that is proportional to the flow rate of crop at the point of ingestion into the combine harvester 10. As noted this provides for a significantly more accurate control regime than has hitherto been possible.

Figure 2:
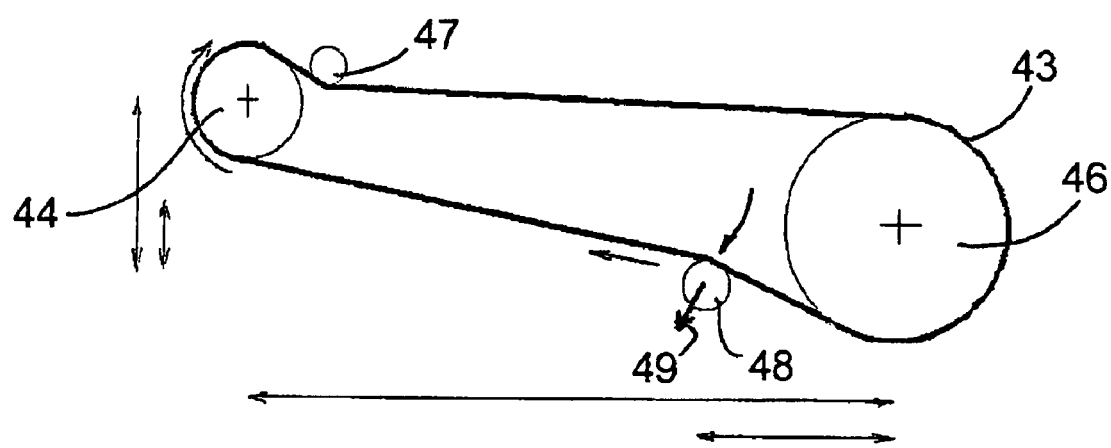
FIG. 2 shows in schematic form part of an apparatus whose purpose is to measure the flow rate of crop through the combine harvester of FIG. 1 in accordance with the principles described herein.
Figure 3:
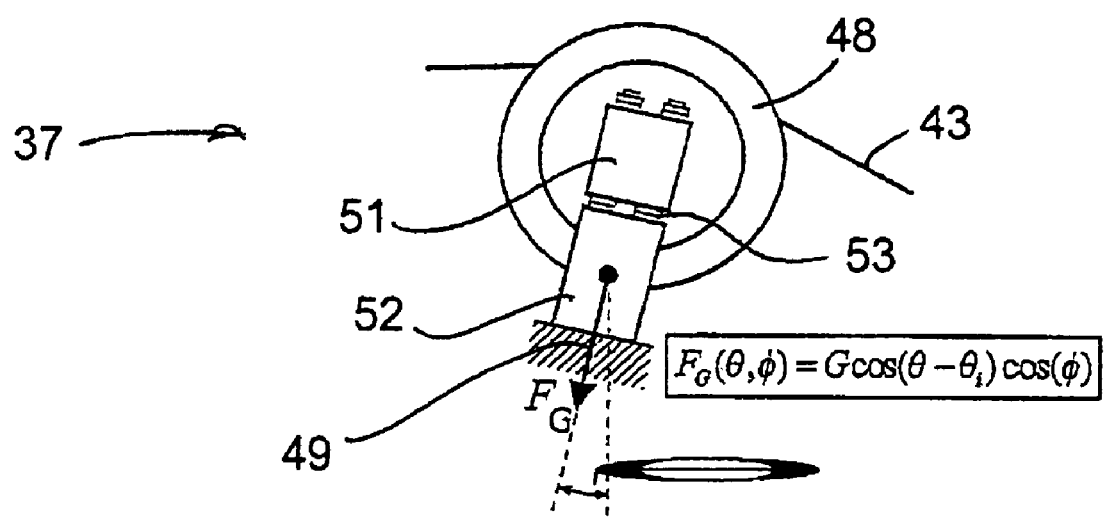
FIG. 3 is an enlargement of part of the FIG. 2 apparatus, showing the precise arrangement for measuring tension in a drive belt.

One arrangement for measuring the tension in the drive belt 43 is shown in FIGS. 2 and 3.

As best shown in FIG. 2, the drive belt 43 is an endless, generally ovaloid belt with a trapezoid cross section of a per se known kind that is looped around, at one end, a driving pulley 44 and at another end a driven pulley 46.

As is known per se, the driving pulley 44 is operatively connected to a shaft incorporating a clutch whose purpose is to engage and disengage the header and straw elevator drive.

The driven pulley 46 is connected to an intermediate shaft that in turn provides drive to the rotatable parts of the header assembly 18 and straw elevator 19.

A spring-loaded tensioning idler roller 47 is located so as to provide a minimal tension in the drive belt 43 such that it does not slacken and remains in permanent contact with the surfaces of the pulleys 44 and 46.

A sensor pulley 48 is positioned to engage the lower run of drive belt 43 such that the drive belt passes over it during operation of the arrangement of components shown in FIG. 2. In accordance with the invention, the sensor pulley 48 measures a component of force (labelled 49 in FIG. 2) that is normal to the tangential contact of the drive belt 43 with the sensor pulley 48.

As set out below, the force component 49 is proportional to the flow rate of crop through the combine harvester 10.

FIG. 3 shows the sensor pulley 48 in more detail.

As is illustrated schematically in FIG. 3, the shaft about which pulley 48 rotates is journalled in a pillow block or similar component 51 that is operatively connected to a reaction member 52 by way of one or more load cells 53. The load cell 53 may take any of a range of known forms. As shown schematically by shading in FIG. 3, reaction member 52 is fixed relative to the chassis or frame 12 of the combine harvester 10 or to the body of the straw elevator 19.

The pillow block 51 and reaction member 52 define a longitudinal axis that is inclined relative to the vertical, as shown in FIG. 3. The angle of deviation $\theta_i$ of the axis of the pillow block 51 and reaction member 52 to the vertical defines the aforesaid normal to the tangent of contact of the drive belt 43 with sensor pulley 48. As is apparent from FIG. 2, the angle $\theta_i$ is measured in a vertical plane in the longitudinal (fore-and-aft) direction of the combine harvester 10.

The mass of the sensor pulley 48 must be taken account of in any calculation of the flow rate of crop based on a measurement of tension in the drive belt 43. To this end, it is possible to calculate the component of force in the direction of line 49 according to the expression $$F_G(\theta, \phi) = G \cos(\theta - \theta_i) \cos(\phi)$$

wherein:
$F_G$ is the gravity force component of the mass of the sensor pulley 48 and pillow block 51 in the direction of line 49;
$\theta$ is the longitudinal inclination of the combine harvester relative to the horizontal; and
$\phi$ is the transverse (side-to-side) inclination of the combine harvester 10, again measured relative to the horizontal.

Longitudinal and transverse inclinations $\theta$, $\phi$ can be measured by appropriately installed inclination sensors on the harvester 10.

The load cell 53 measures a force F(t) that is related to the tension in the drive belt and the gravity force $F_G$ by the expression $$F(t) = F_C(t) + F_G(\theta(t), \phi(t)) + F_0$$

wherein
$F_0$ is a zero-load force component;
$F_G$ is as defined above; and
$F_C$ is the component of force related to the flow rate of crop through the combine harvester.

The zero-load force component $F_0$ may be established for example through the operation of a calibration routine that may run before harvesting operations commence. The zero-load force component represents the tension induced in the drive belt 43 by reason of operation of the rotatable parts of the header assembly and straw elevator when no grain is being transported through them. Thus is it readily possible to assess the zero-load force component $F_0$ simply by operating the cutter bar and straw elevator with the cutter bar raised sufficiently high that it does not engage and cut crop.

From the aforementioned expression relating the measured drive belt tension, the zero-load drive belt tension and the force due to gravity acting on the sensor pulley it is readily possible to calculate the instantaneously prevailing flow rate of crop through the combine harvester.

The output of this calculation is represented as line 36 in FIG. 4, being the fed back flow rate or throughput measurement that is used to tune the ground speed of the combine harvester (in accordance with the invention) in dependence on the actual flow rate of crop and hence the instantaneously prevailing crop density.

A factor however in the control scheme is the static gain of the components forming the apparatus. This may be dealt with in the control system forming the apparatus of the invention by way of a static gain estimator 54 the output of which is used for adjusting the gain terms in the outermost loop of the two-loop control scheme shown in FIG. 4. The static gain estimator provides a model for the relation between the instantaneous speed signal 28 and the instantaneous crop flow rate signal 36.

The static gain estimator 54 operates according to a preferred algorithm to feed a variable gain into a proportional-integral-differential ("PID") controller 56 incorporated in the feed rate controller 32 shown in FIG. 4.

Figure 5:
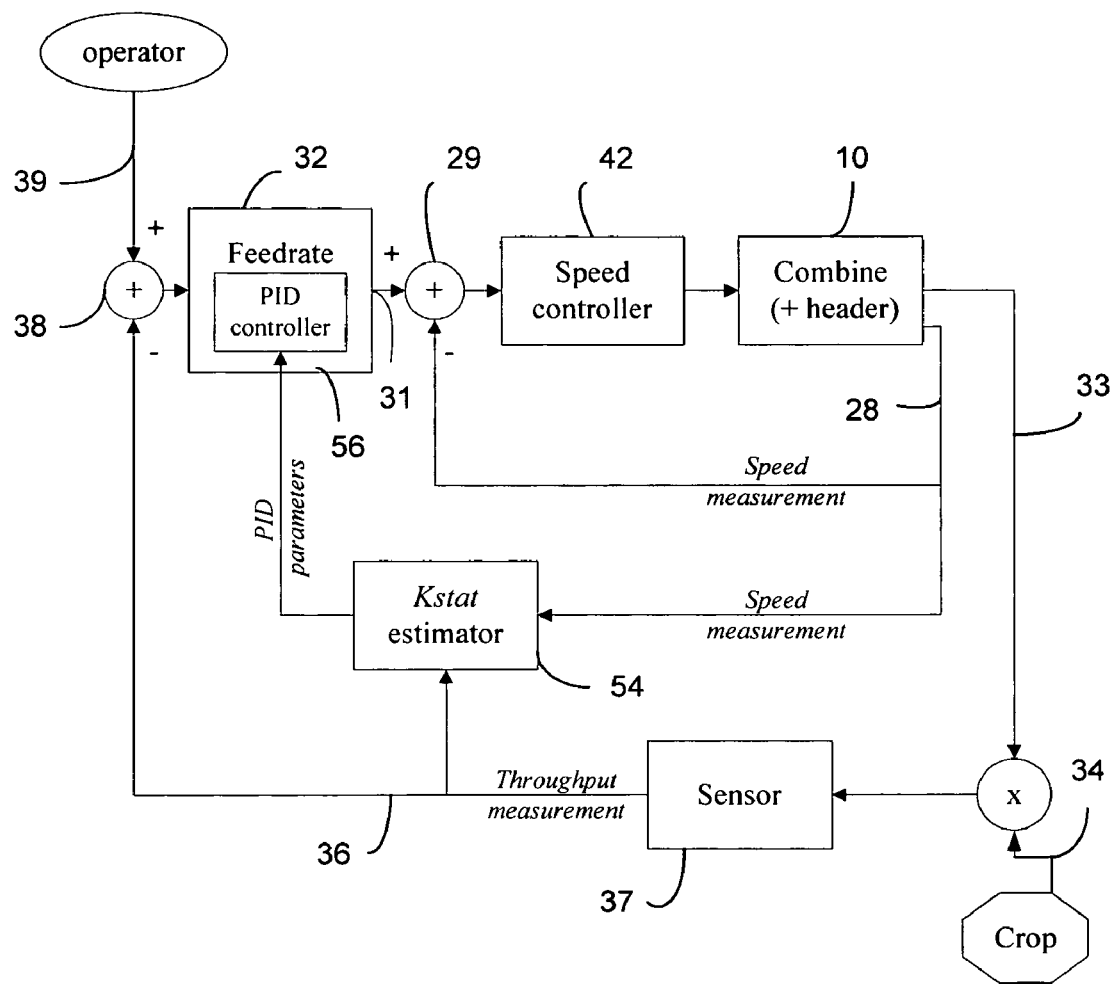
FIG. 5 shows a further diagram of the control loops, including detail of a static gain estimator that optionally may be present in apparatus according to the invention.

As best shown in FIG. 5, the inputs to the estimator 54 of static gain are the ground speed 28 of the combine harvester and the flow rate 36 and the output is fed to the PID controller 56. The ground speed may be derived from the output of the speed controller 42 or measured by an appropriate speed sensor on the combine. The feed rate is derived from the drive belt tension as described above.

Figure 6:
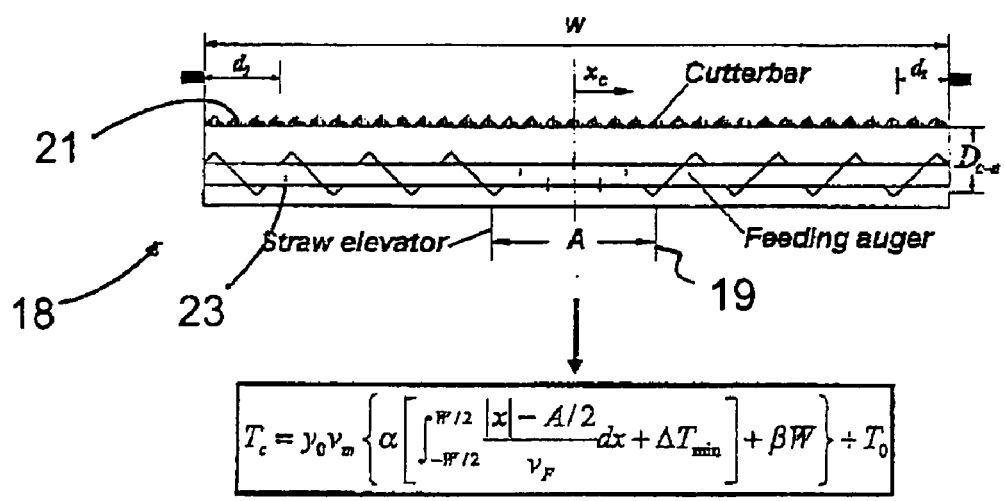
FIG. 6 schematically illustrates the parameters that contribute to the static gain in a typical combine harvester configuration.

FIG. 6 illustrates the parameters that the estimator 54 takes account of in calculating the static gain of the system.

As shown by the expression in FIG. 6, the driving torque of the header and elevator $T_c$ (which includes a component proportional to the crop flow rate calculated in accordance with the principles of the invention set out above) is related to the header assembly 18, cutting width W, the crop elevator width A, the zero load torque $T_0$, the forward speed of the machine $v_m$ over the ground and the local total crop yield $y_0$. Changes to any of these parameters will reflect in the driving torque of the header and elevator, and hence in the forces sensed by the crop flow rate sensor 37. As the consequent flow rate signal 36 is used for permanent recalculation of the static gain $K_{stat}$, this value will change accordingly. Hence, the system adapts the parameters of the PID controller to changes such as varying crop yield $y_0$, replacement of the header by a header having a different cutting width W, or redirecting the harvester over the crop edge to use a smaller or larger section of the header for harvesting fresh crop.

Feeding of an estimated static gain to a PID controller 56 as shown in FIG. 5 reduces the instability of the control scheme. The system decreases the PID gain terms when the estimated static gain $K_{stat}$ increases and vice versa. In this manner it is possible to obtain a sturdy and equable feed rate control.

Overall, the reader may consider the fed back ground speed measurement 28 as a first signal of the invention as defined herein; and the crop flow rate signal 36 as the second signal, the second control device being the controller 32 that generates the third signal 31 which is fed forwardly to the first control device 42.

The fourth signal is represented by numeral 39 in FIG. 4; and the fifth signal, fed back via the estimator 54, being visible in FIG. 5 as the lower input to the estimator.

The invention claimed is:

1. An apparatus for controlling the speed of a combine harvester comprising:
   at least one sensor generating one or more signals that correspond during use of the combine harvester to variables of a harvesting process;
   a processor; and
   at least two control devices operatively connected in a feedback arrangement including two loops in a first loop of which a first signal corresponding to the ground speed of the combine harvester is fed back as an input to a first control device that is capable of adjusting the ground speed relative to a set value, and in a second loop of which the first signal is fed together with a second signal indicative of the flow rate of crop through the combine harvester to a second control device that generates as a third signal the set value, the third signal being input to the first control device.

2. Apparatus according to claim 1 wherein a fourth signal corresponding to a desired crop flow rate value is additionally input to the second control device, the magnitude of the fourth signal being manually adjustable by an operator of the combine harvester or automatically by a further controller in response to the variables of the harvesting process.

3. Apparatus according to claim 1 wherein the combine harvester includes a header having a first rotatable component and wherein the second signal indicative of the flow rate of crop is generated at least in part by a header drive torque sensor that measures the header drive torque generated in the first rotatable component and outputs a header drive torque signal that is related thereto.

4. Apparatus according to claim 3 including a drive belt for driving the first rotatable component, wherein a tension sensor measures tension in the drive belt and generates a tenson signal related thereto.

5. Apparatus according to claim 4 including a sensing pulley in engagement with the drive belt, the sensing pulley including or being operatively connected to a load cell for measuring the force acting between the drive belt and the sensing pulley, wherein the load cell generates a signal indicative thereof.

6. Apparatus according to claim 4 wherein the tension signal representing the tension in the drive belt is calculated in the processor in accordance with the expression $$F(t) = F_c(t) + F_{G(\theta(t), \phi(t))} + F_0$$

wherein
   F is the measured force;
   $F_0$ is a zero-load force component;
   $F_G$ is a gravity-induced force component related to the effect of gravity on the mass of the sensing pulley; and
   $F_c$ is a component of force related to the flow rate of crop through the combine harvester.

7. Apparatus according to claim 3 further including an estimator of a variable static gain of the header operatively connected in the feedback arrangement.

8. Apparatus according to claim 7 wherein the estimator is operatively connected in the first control loop and wherein the first signal corresponding to the ground speed of the combine harvester is fed back via the estimator.

9. Apparatus according to claim 7 wherein the estimator is operatively connected in the first control loop and wherein a fifth signal indicative of a feed rate of crop through the combine harvester is fed back via the estimator.

10. Apparatus according to claim 7 wherein the variable static gain estimated by the estimator is the relation between the ground speed of the combine harvester and the flow rate of crop through the combine harvester.

11. Apparatus according to claim 10 wherein the variable static gain is defined by the expression $$Kstat = y_0((W-A)^2 + bW/a + c)$$

wherein
   Kstat is the variable static gain;
   $y_0$ is the local total crop yield;
   W is the cutting width of the header;
   A is the width of the straw elevator; and
   a, b and c are constants.

12. Apparatus according to claim 1 wherein the combine harvester includes a straw elevator having a further rotatable component and wherein the second signal indicative of the flow rate of crop is generated at least in part by a straw elevator drive torque sensor that measures the straw elevator drive torque generated in the further rotatable component and outputs a straw elevator drive torque signal that is related thereto.

13. Apparatus according to claim 1 wherein the first control device includes an engine governor adjuster or an actuator that positions a swash plate in at least one of a hydraulic pump and motor.

14. Apparatus according to claim 1 wherein the processor is programmable and includes programmed therein one or more calibration algorithms for calibrating the apparatus in accordance with at least one of a type of header fitted to the combine harvester, a header width, and a type of crop to be harvested.

15. A combine harvester including apparatus according to claim 1, the combine harvester including at least one sieve having operatively connected thereto a sieve sensor for detecting the amount of material on the sieve and generating a signal indicative thereof, the signal output of the sieve sensor being input to the processor of the apparatus and the processor being arranged to reduce the flow rate of crop through the combine harvester in the event of the sieve sensor indicating a sieve overload condition.

16. A method of controlling the ground speed of a combine harvester including apparatus comprising:
   one or more sensors each generating one or more signals that correspond during use of the combine harvester to variables of a harvesting process; and
   a processor,
   the method further comprising the steps of generating in each of one or more sensors one or more signals that correspond during use of the combine harvester to variables of a harvesting process, and in dependence on the values of the signals operating at least two control devices connected in a feedback arrangement comprising two loops in a first loop of which a first signal corresponding to the ground speed of the combine harvester is fed back as an input to a first control device that is capable of adjusting the ground speed relative to a set value, and in a second loop of which the first signal is fed together with a second signal indicative of the flow rate of crop through the combine harvester to a second control device that generates as a third signal the set value, the third signal being input to the first control device.

* * * * *